United States Patent [19]

Akiyama

[11] 3,820,036

[45] June 25, 1974

[54] HYBRID FEEDBACK AMPLIFIER

[75] Inventor: Susumu Akiyama, Tokyo, Japan

[73] Assignee: Nippon Electric Company, Limited, Tokyo, Japan

[22] Filed: Nov. 24, 1972

[21] Appl. No.: 309,372

[30] Foreign Application Priority Data

Nov. 26, 1971 Japan .............................. 46-95536

[52] U.S. Cl. ...................... 330/28, 330/79, 330/94, 330/107, 330/109

[51] Int. Cl. ............................................ H03f 1/08

[58] Field of Search .......... 330/28, 79, 94, 107, 109

[56] References Cited

UNITED STATES PATENTS 3,487,325 12/1969 Klockow .......................... 330/28 X

*Primary Examiner*—Herman Karl Saalbach
*Assistant Examiner*—James B. Mullins
*Attorney, Agent, or Firm*—Sughrue, Rothwell, Mion, Zinn & Macpeak

[57] ABSTRACT

A hybrid amplifier for connecting a signal carrying line to a repeater. The hybrid includes an autotransformer having a center tap dividing it into two portions. The signal carrying line, an amplifier section, a terminating resistor, and a feedback network are connected to the autotransformer in such a manner that the signal carrying line and the feedback network form a first conjugate pair and the amplifier section and the terminating resistor form a second conjugate pair.

12 Claims, 8 Drawing Figures

HYBRID FEEDBACK AMPLIFIER

BACKGROUND OF THE INVENTION

This invention relates to repeated coaxial transmission systems and, in particular, to hybrid feedback amplifiers used in the repeaters.

In coaxial transmission systems for frequency-division-multiplex (FDM) signals, repeaters are used along a transmission line at fixed intervals to compensate for losses experienced by the transmitted signal due to the transmission line. Typically, these repeaters include a hybrid feedback amplifier at the input to the repeater or at the output of the repeater, which is designed so that the reflection of the transmitted signal is minimized, thus minimizing transmission distortion.

Hybrid feedback amplifiers are well-known in the art, and are shown, for example, in the U.S. Pat. No. 3,487,325. This conventional feedback amplifier includes an autotransformer in a hybrid feedback amplifier, which autotransformer connects the line and the feedback network of the amplifier to form a conjugate pair and connects the amplifier and a terminating resistor, which is floating with respect to ground. The autotransformer is connected in the feedback path of the hybrid amplifier since it is connected between the feedback circuit and the amplifier. The autotransformer may have a better high frequency response than the standard isolation transformer and, therefore, the hybrid amplifier also may have an improved high frequency response. However, since the hybrid feedback amplifiers are generally employed at both the input to and the output of one of the repeaters, two autotransformers are necessary, and hence the circuit construction become complex and costly to manufacture.

SUMMARY OF THE INVENTION

In view of the above, an object of the present invention is to provide hybrid feedback amplifiers of simple circuit construction which are inexpensive to manufacture.

In a basic embodiment according to the present invention, an autotransformer, which is arranged to provide unequal power division, includes three terminals, i.e., first, second and intermediate terminals. The intermediate terminal is grounded; the carrier line is connected between one of the terminals of the input terminal pair of an amplifier section and a ground; the first terminal of the autotransformer is connected to the other one of the input terminals; an input terminal of a feedback network is connected to the non-grounded side of the output terminal pair of the amplifier section; the output terminal of the feedback network is connected to the second terminal of the autotransformer; a terminating resistor is connected between the second terminal of the autotransformer and the input terminal of the input terminal pair of the amplifier network, which terminal is connected to the carrier line; one side of the output terminal pair of the hybrid feedback amplifier is connected to the non-grounded terminal of the output terminal pair of the amplifier section, and the other side is grounded; and the other terminal of the output terminal pair of the amplifier section is grounded. Thus, the line and the feedback network form the first conjugate pair, and the amplifier section and the terminating resistor form the second conjugate pair, thereby constituting a hybrid feedback circuit.

DETAILED DESCRIPTION OF THE INVENTION

Figure 1:
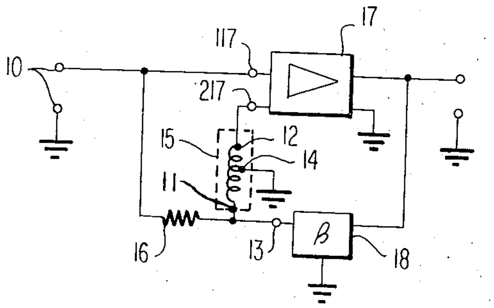
FIGS. 1 through 8 are schematic circuit diagrams showing hybrid feedback amplifiers of the first through eighth embodiments of the invention.

Referring to FIG. 1, which is a schematic diagram showing a hybrid feedback amplifier of the first embodiment of the invention, a signal input terminal pair 10 is connected between one input terminal 117 of an amplifier section 17 and a ground. A terminating resistor 16 is inserted between the input terminal 117 and an output terminal 13 of a feedback network 18. An autotransformer 15 has three terminals, i.e., first, second and intermediate terminals 12, 11 and 14, the intermediate terminal 14 being grounded. The first terminal 12 is connected to the other input terminal 217 of the amplifier section 17, and the second terminal 11 to the output terminal 13. One of the output terminal pair of the amplifier section 17 is grounded, and the other terminal is connected to the input of the feedback network 18 and to one of the output terminal pair of the hybrid feedback amplifier, the other terminal of the output terminal pair being grounded. Thus, the input of the amplifier section 17 and the terminating resistor 16 constitute a conjugate pair, and a signal carrying network connected to the input terminal pair 10 and the output of the feedback network 18 constitute another conjugate pair. It is assumed that the signal carrying network is connected to the terminal pair 10 and the inner impedance of the signal carrying network is $r_0$; the resistance value of the terminating resistor 16 is $R_0$; the input impedance of the amplifier section 17 is $R_1$; the winding ratio of the winding between the terminals 12 and 14 to that between the terminals 14 and 11 is $n_1 : n_2$; and the signal current flowing from the signal carrying network through the input terminal pair 117-217 and the terminals 12 and 14 of the autotransformer 15 to ground is $I_1$. Also it is assumed, for the convenience of the following circuit analysis, that the feedback network 18 is removed. Then the current flowing from the signal carrying network through the terminating resistor 16 and terminals 11 and 14 into the ground is given by $I_1 \, x \, (n_1/n_2)$. The signal voltage appearing across the terminal pair 117-217 is $R_1 I_1$, and the signal voltage appearing across the terminating resistor 16 is $R_o I_1 \; (n_1/n_2)$. If $$R_1 = [(n_1 + n_2)/n_2] r_0 \tag{1}$$

$$R_0 = [(n_1 + n_2)/n_1] r_0 \tag{2}$$

are satisfied, the above-mentioned two signal voltages become equal to each other. Therefore, there appears no signal between the two ends of the autotransformer. As a result no signal component is transmitted from the signal carrying network to the terminal 13 and the signal applied to the input terminal pair 10 is not passed to the feedback network 18. On the other hand, assuming that another signal voltage applied to the terminal 13 from the feedback network 18 is $E_1$, and that, for the convenience of the circuit analysis, the signal carrying network is removed, the voltage appearing at the terminal 12 is given by $-(n_1/n_2)E_1$. Therefore, total signal current I flowing through the terminating resistor 16 and the terminal pair 117-217 is given by $$I = \{ E_1 - [-(n_1/n_2)\,E_1]/(R_1 + R_0) \} \quad (3)$$

Hence, the voltage appearing at terminal 10, i.e. $(E_1 - R_0 I)$, become zero when the Equations 1 to 3 are satisfied. Therefore, according to the so-called superposition theory, the signal carrying network and the output of the feedback network 18 constitute the conjugate pair.

Figure 2:
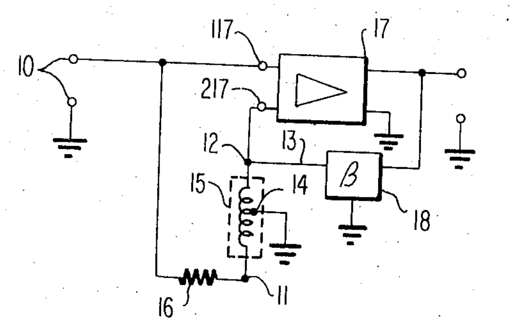

FIG. 2 is a schematic diagram of the second embodiment of the invention. In FIG. 2, the hybrid feedback circuit is used at the input side of the amplifier network 17 as in the arrangement of FIG. 1. The two arrangements in FIGS. 1 and 2 are the same except the connection of the feedback network 18 to the autotransformer 15. Similarly, the signal carrying network to be connected to the input terminal pair 10 and feedback network 18 form the conjugate pair, since the signal voltage applied to the input terminal pair 10 does not appear at the ends of the autotransformer 15. In the embodiment of FIG. 1, the feedback signal from the feedback network is passed to the input terminal pair of the amplifier section without changing its polarity. While, in the embodiment of FIG. 2, the polarity is reversed when it is delivered to the input terminal pair of the amplifier section. In other words, the hybrid feedback circuit of this invention is capable of feedback with either polarity by the use of the autotransformer.

Figure 3:
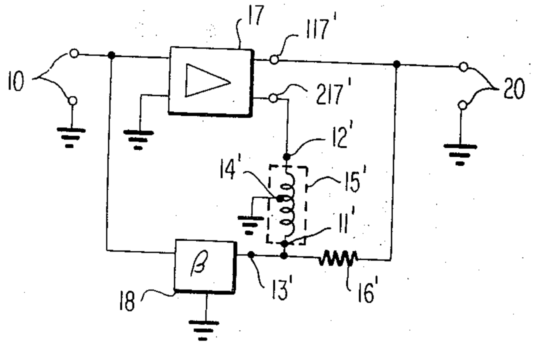

FIG. 3 is a schematic diagram showing the third embodiment of the invention, in which a hybrid feedback circuit comprising the autotransformer is used at the output side of the amplifier section 17. This arrangement is akin to that having the hybrid feedback circuit in the input side. Circuit components in FIG. 3 functionally similar to those in FIG. 1 are indicated by identical numerals with an inverted comma attached. A signal output terminal pair 20 is connected between an output terminal 117' of the amplifier section 17 and the ground. A terminating resistor 16' is inserted between the output terminal 117' and an input terminal 13' of the feedback network 18. An autotransformer 15' has its intermediate terminal 14' grounded, its one terminal 12' connected to the other output terminal 217' of the amplifier section 17 and its other terminal 11' connected to the terminal 13'. The operating principle of the circuit in FIG. 3 is similar to that in FIG. 1. The other signal carrying network to be connected to the output terminal pair 20 and the input of the feedback network 18 form the conjugate pair.

Figure 4:
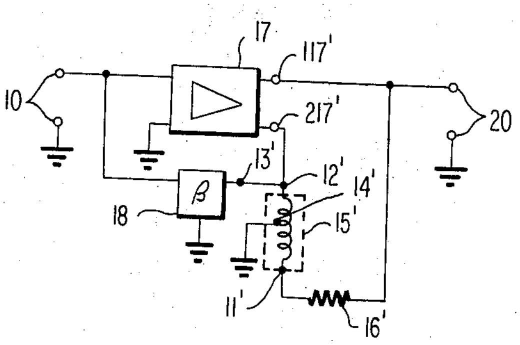

FIG. 4 is a schematic diagram showing the fourth embodiment of the invention, in which the hybrid feedback circuit is used on the output side of the amplifier section 17 as in the embodiment of FIG. 3. Circuit components in FIG. 4 similar to those in FIG. 3 are indicated by identical symbols. The connection of the feedback network 18 to the autotransformer 15' is different from FIG. 3. Similar to FIG. 3, the other signal carrying network to be connected to the output terminal pair 20 and the input of the feedback network 18 form the conjugate pair.

Figure 5:
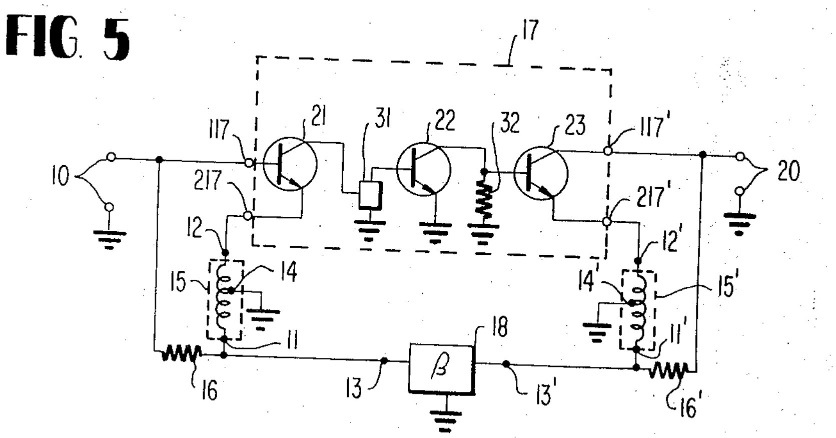

FIG. 5 is a schematic diagram showing the fifth embodiment of the invention wherein the hybrid feedback circuit of the invention is used both at the input side and at the output side of a three-stage amplifier section 17 using transistors 21 to 23. The components of the hybrid feedback circuit at the input side in FIG. 5 similar to those in FIG. 1 are indicated by identical symbols. Also, the components of the hybrid feedback circuit at the output side in FIG. 5 similar to those in FIG. 3 are indicated by identical symbols. An input terminal pair 117-217 of the amplifier section 17 is connected to the base and emitter of an input stage npn transistor 21 respectively, and the collector of this transistor is connected to the base of the middle stage transistor 22 via a wave-shaping network 31. The transistor 22 has its emitter grounded, and its collector connected to a load resistor 32 and to the base of a transistor 23. The collector and the emitter of the transistor 23 are connected respectively to output terminal pair 117' and 217' of the amplifier section 17. An example of the wave-shaping network 31 is shown in FIG. 3 of the above-mentioned U.S. Pat. No. 3,487,325 by numeral 40. The output side hybrid circuit is arranged in the same manner as in the embodiment of FIG. 3.

In the embodiment of FIG. 5, the amplifier section 17 is arranged so that the signal applied to the input terminal pair 117 and 217 appears with its polarity inverted at the output terminal pair 117' and 217'. For negative feedback, therefore, both the input and output terminal of the feedback network 18 are connected to the same polarity feedback points, i.e., terminals 11 and 11', respectively. Also, in this embodiment, negative feedback can be obtained even if the input and output of the feedback network 18 are both connected to the reverse polarity feedback points, i.e., terminals 12 and 12', respectively, because the reverse polarity feedback on the input and output sides results in the feedback at the same polarity. If the signals of the amplifier section are in phase at the input terminal pair and the output terminal pair, it is necessary that the input and output terminals of the feedback network 18 be connected between the terminal 12' of the output side hybrid circuit and the terminal 11 of the input side hybrid circuit, respectively; or between the terminal 11' of the output side hybrid circuit and the terminal 12 of the input side hybrid circuit, respectively.

Figure 6:
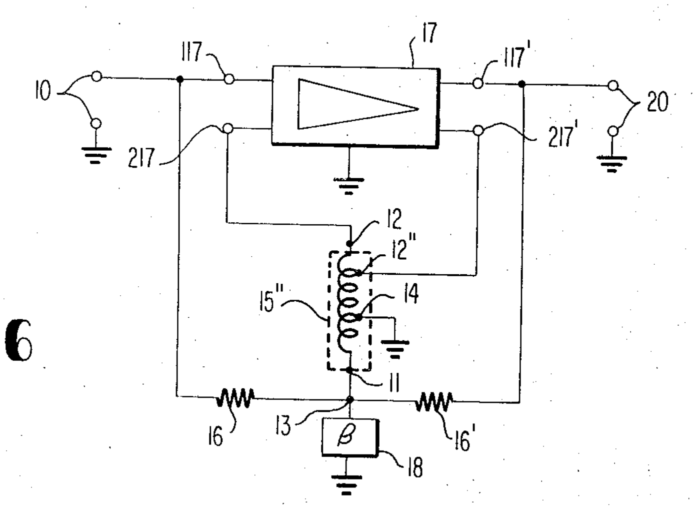

FIG. 6 shows the sixth embodiment of the invention, in which input and output hybrid feedback circuits are realized by the use of one single autotransformer. Circuit components in FIG. 6 functionally similar to those in FIGS. 1 and 3 are indicated by identical references. An input signal terminal pair 10 is connected between an input terminal 117 of the amplifier section 17 and the ground, and the terminating resistor 16 for the input hybrid circuit is connected between the terminal 117 and the terminal 13 of the feedback network 18. The other terminating resistor 16' is connected between the terminal 117' and the terminal 13. The autotransformer 15'' has two intermediate terminals 12'' and 14. The latter terminal 14 is grounded, and the other intermediate terminal 12'' is connected to the output terminal 217'. The terminal 12 of the transformer 15'' is connected to the input terminal 217, and the other terminal 11 to the terminal 13. An output terminal pair 20 is connected to the output terminal 117' and the ground. The feedback network is constituted of the impedance elements present between the terminal 13 and the ground. The amplifier section 17 is such as shown in FIG. 5 in which the signal applied to the input terminal pair 117 - 217 appears with its polarity inverted at the output terminal pair 117' - 217'.

The embodiment of FIG. 6 is characterized by the use of one autotransformer to form input and output hybrid circuits. The operation of this embodiment will be readily understood from the following description taken by referring to FIG. 5. In the embodiment of FIG. 5, if the two terminals 13 and 13' of the feedback network 18 can be connected to each other, the winding between the terminals 14 and 11 of the autotransformer 15 is connected in parallel with the winding between the terminals 14' and 11' of the autotransformer 15'. This means that these windings may be replaced with one winding. This principle is applicable to the winding between the terminals 12 and 14 and the winding between the terminals 12' and 14'. More specifically, if the number of turns of the winding between the terminals 12 and 14 is larger than that of the winding between the terminals 12' and 14', an intermediate terminal is provided between the terminals 12 and 14 so that the potential at this intermediate terminal is equal to that at the terminal 12'. This can be realized, as evident from transformer theory, because the potentials are the same at the terminal 11 and at the terminal 11'. In other words, by installing an additional intermediate terminal, the winding between the connection point 12' of the output side autotransformer 15' and the terminal 14' can be replaced with the winding between the additional intermediate terminal and the grounding intermediate terminal 14. The intermediate terminal 12'' of the autotransformer 15 in FIG. 6 is the one to be additionally installed in like manner. When the turn ratio of the autotransformer required for the input side hybrid circuit is the same as that required for the output side hybrid circuit, the intermediate terminal 12'' in FIG. 6 is not needed. In this case, the terminal 12 may be used in common for both the input and output hybrid circuits. In the embodiment in FIG. 6, the feedback network 18 is connected between the terminal 13 and the ground. Alternatively, the feedback network 18 may be connected between the terminal 12 or 12' and the ground after impedance modification according to the turn ratio among the winding of the autotransformer 15. Also, the terminal 11 used in common for the input and output side hybrid circuits may be replaced with the terminal 12 for the same purpose. In such case, the terminals 11 and 11' of the input and output hybrid circuits are provided at the point opposite to the terminal 12 with respect to the intermediate terminal on the autotransformer.

Figure 7:
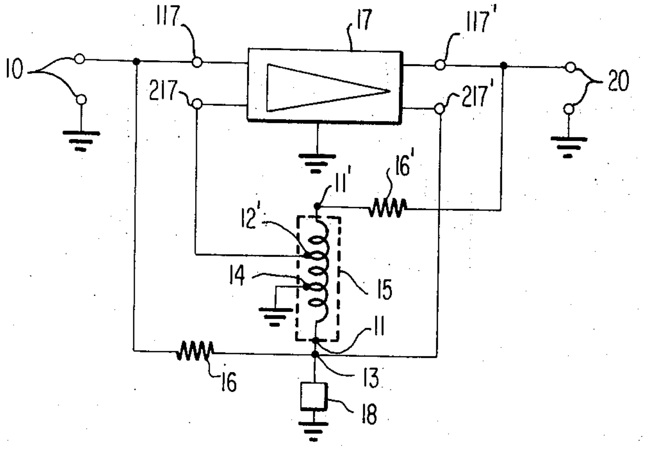

FIG. 7 shows the seventh embodiment of the invention, in which one autotransformer is used to constitute input and output hybrid circuits. In FIG. 6, it is assumed that the input signal and the output signal of the amplifier section 17 are of mutually inverse polarities. Whereas, in the seventh embodiment, the input and output signals are in phase. In FIG. 6, the in-phase feedback input hybrid circuit as in FIG. 1 and another in-phase feedback output hybrid circuit as in FIG. 3 are combined together by the use of an autotransformer in order to form a negative feedback circuit. While, in the embodiment in FIG. 7, the in-phase feedback input hybrid circuit as in FIG. 1 and the inverted phase feedback output hybrid circuit are combined by the use of one autotransformer. Therefore, in the seventh embodiment, the terminal 11 is used in common for the input side hybrid circuit and the output side hybrid circuit. The input side hybrid circuit terminal 12' and the output side hybrid circuit terminal 11' are provided at the points opposite to the terminal 11 with respect to the intermediate terminal 14 on the autotransformer 15.

Figure 8:
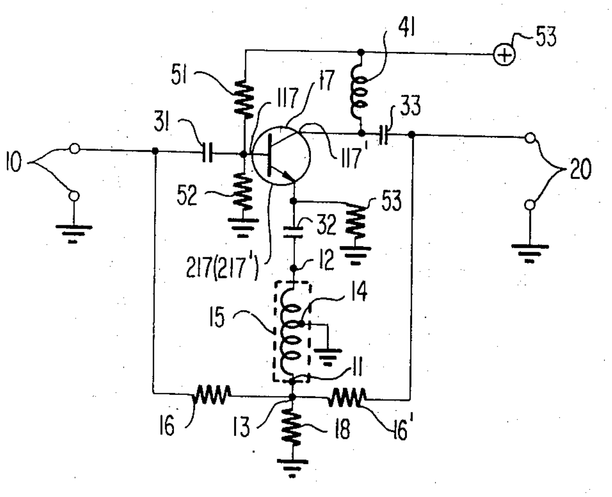

FIG. 8 shows the eighth embodiment of the invention, in which the arrangement having one autotransformer to form input and output hybrid feedback circuits is applied to a one-stage transistor amplifier. In FIG. 8, an npn transistor 17 is used for the amplifier circuit where the base electrode and emitter electrode serve as the input terminal pair 117 - 217 of the amplifier section, and the collector electrode and emitter electrode as the output terminal pair 117 - 217'. In this arrangement therefore, the emitter electrode is used as common terminal corresponding to the terminals 217 and 217'. One terminal of the input terminal pair 10 is coupled to the base electrode (117) of the transistor 17 via a coupling capacitor 31, and the other terminal is grounded. The emitter electrode (217) is connected to the terminal 12 by way of the capacitor 31, and a terminating resistor 16 of the input hybrid circuit is connected between the terminal 11 and the one terminal of the terminal pair 10. One of the output terminal pair 20 is connected to the collector (117') by way of a coupling capacitor 33, and a terminating resistor 16' of the output hybrid circuit is connected between the non-grounded terminal of the terminal pair 20 and the terminal 11. The autotransformer 15 is grounded at its intermediate terminal 14 and effects hybrid feedback on the input and output sides in common. A resistor 18 is used for the feedback network. Resistors 51, 52 and 53 are for supplying bias current and voltage to the transistor 17, and a choke coil 41 for supplying bias voltage and current to the transistor 17 from the positive power source 53.

In the hybrid feedback amplifier of the present invention, as has been described above, an autotransformer is used to form hybrid feedback circuits, and hybrid feedback can be realized for the input and output sides of the amplifier by the use of one single autotransformer. It is apparent that the invention can greatly contribute to improving on the high frequency characteristics and to lowering the production cost.

In addition, the negative feedback network can be realized regardless of the polarity of the output signal of the amplitude section.

What is claimed is:

1. A hybrid feedback amplifier comprising:

an autotransformer having a winding and a center tap dividing said winding into a plurality of portions;

an amplifier section;

a feedback network;

means for connecting a signal carrying network across essentially the series combination of one terminal pair of said amplifier section and one portion of said autotransformer;

a terminating resistor connected across essentially the series combination of said one terminal pair and said winding, having such value that the signal on said signal carrying network appears as substantially equal voltages across said one terminal pair and said terminating resistor with a zero net signal voltage across said feedback network; and means for feeding back a part of the output signal of said amplifier section to the input of said amplifier through said feedback network.

2. A hybrid feedback amplifier as claimed in claim 1 wherein, said one terminal pair of said amplifier section is the input terminal pair, and said autotransformer has first and second end terminals, a first terminal of said input pair being connected to the non-grounded input terminal of said hybrid feedback amplifier and one side of said terminating resistor, the other side of said terminating resistor being connected to the second end terminal of said autotransformer, the first end terminal of said autotransformer being connected to second terminal of said input pair.

3. A hybrid feedback network as claimed in claim 2 wherein said means for feeding back is connected between one terminal of an output terminal pair of said amplifier section and said second end terminal of said autotransformer.

4. A hybrid feedback network as claimed in claim 2 wherein said means for feeding back is connected between one terminal of an output terminal pair of said amplifier section and said first terminal of said autotransformer.

5. A hybrid feedback amplifier as claimed in claim 1 wherein said one terminal pair of said amplifier section is the output terminal pair, and said autotransformer has first and second end terminals, a first terminal of said output pair serving as one output terminal of said hybrid amplifier and being connected to one side of said terminating resistor, the other side of said terminating resistor being connected to the second end terminal of said autotransformer, the first end terminal of said autotransformer being connected to the second of said output terminal pair, an input terminal pair of said amplifier section, and said means for feeding back being connected between one of the input terminal pair of said amplifier section and one of the end terminals of said autotransformer.

6. A hybrid feedback amplifier as claimed in claim 5 wherein said means for feeding back is connected to the first end terminal of said autotransformer.

7. A hybrid feedback amplifier as claimed in claim 5 wherein said means for feeding back is connected to the second end terminal of said autotransformer.

8. A hybrid feedback amplifier as claimed in claim 1 wherein said amplifier section has an input terminal pair and an output terminal pair and is operable to invert a signal between said input and output terminal pair, said autotransformer having first and second end terminals connected respectively to one of said input terminal pair and one side of said terminating resistor, the other said input terminal pair being connected to the other side of said terminating resistor, said hybrid feedback amplifier comprising a second autotransformer having first and second end terminals and a center tap, said first end terminal of said second autotransformer being connected to one of the output terminal pair of said amplifier section, and a second terminating resistor connected between the other of said output terminal pair and the second end terminal of said second autotransformer, and wherein said means for feeding back is connected between like end terminals of said first and second autotransformers.

9. A hybrid feedback amplifier as claimed in claim 8 wherein said first and second autotransformers have their center taps grounded.

10. A hybrid feedback amplifier as claimed in claim 2 further comprising an output terminal pair of said amplifier section, a second terminating resistor having one end connected to one of said output terminal pair and the other end connected to said second end terminal, and an additional tap on said autotransformer intermediate said center tap and said end terminal and being connected to the other of said output terminal pair, and wherein said amplifier section comprises amplifier stages for inverting the signal polarity between said input and output terminal pairs.

11. A hybrid feedback amplifier as claimed in claim 1 wherein said amplifier section comprises an input terminal pair and output terminal pair and amplifier means for amplifying a signal without causing phase reversal between said input and output terminal pairs, said autotransformer having first and second end terminals and an additional tap between said center tap and said first end terminal, said terminating resistor being connected between one of said output terminal pair and said first end terminal, the other of said output terminal pair being connected to said second end terminal, said hybrid feedback amplifier further comprising a second terminating resistor connected between one of said input terminal pair and said second end terminal, the other of said input terminal pair being connected to said additional tap.

12. A hybrid feedback amplifier as claimed in claim 1 wherein said amplifier section comprises a single stage transistor amplifier and said one terminal pair of said amplifier section comprises the base and emitter electrodes of said single stage transistor amplifier, said hybrid feedback amplifier further comprising a second terminating resistor connected across essentially the series combination of an output terminal pair of said amplifier section and said winding, and wherein said output terminal pair comprises the collector and emitter electrodes of said single stage transistor amplifier.

* * * * *